No. 724,681. PATENTED APR. 7, 1903.
G. B. DRYDEN.
RUBBER VEHICLE TIRE.
APPLICATION FILED JAN. 14, 1901.
NO MODEL.
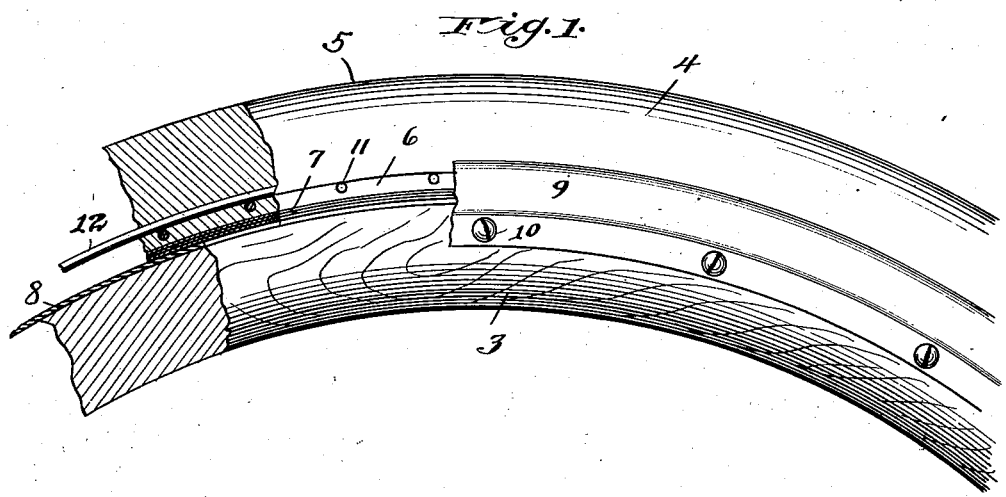
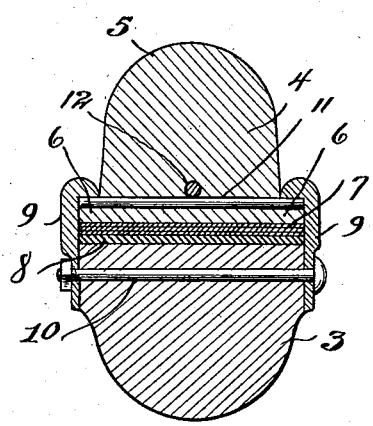
Witnesses,
Inventor,
George B. Dryden,
By Offield Towle & Linthicum
Atty's.

UNITED STATES PATENT OFFICE.

GEORGE B. DRYDEN, OF CHICAGO, ILLINOIS, ASSIGNOR TO FIRESTONE TIRE & RUBBER COMPANY, OF CHARLESTON, WEST VIRGINIA, AND AKRON, OHIO, A CORPORATION OF WEST VIRGINIA.

RUBBER VEHICLE-TIRE.

SPECIFICATION forming part of Letters Patent No. 724,681, dated April 7, 1903.

Application filed January 14, 1901. Serial No. 43,180. (No model.)

*To all whom it may concern:*

Be it known that I, GEORGE B. DRYDEN, of Chicago, in the county of Cook and State of Illinois, have invented certain new and useful Improvements in Rubber Vehicle-Tires, of which the following is a specification.

My invention relates to elastic tires for the wheels of vehicles, and more particularly to means for securing the same rigidly to the rim or felly of the wheel.

The principal objects of my invention are to provide an improved elastic tire so constructed as to have increased wearing qualities; to provide in a tire of this character improved means for securing the same to the rim in a simple and inexpensive manner, so that it may be readily detached and replaced for repair or renewal without requiring the use of special appliances or apparatus; to so construct and arrange the securing means as to most effectively resist tendency to lateral and radial displacement of the tire relative to the rim; to prevent creeping of the tire on the rim, and, in general, to hold the tire firmly and reliably in position, while protecting it from tearing strains.

To these ends my invention consists in the parts and combinations of parts, as hereinafter described, and more particularly pointed out in the claims.

My invention in its preferred form is illustrated in the accompanying drawings, in which—

Figure 1 is a side elevation, partly in section and broken away, of a section of a vehicle-wheel, showing my improvements applied thereto; and Fig. 2 is a vertical transverse section of the same.

In the drawings, 3 designates the usual rim or felly of a vehicle-wheel, and 4 the elastic tire proper, which is to be applied thereto. The latter is preferably made of solid rubber of the necessary degree of hardness and toughness to withstand the wear to which it is subjected and is formed of a gradually-decreasing width from its base portion outwardly, the tread portion having the usual curved or convex face 5, as shown. The inner or base portion of the tire 4 is provided with a pair of integral lateral offsets or shoulders 6, one on either side thereof, which coöperate with means hereinafter described for securing the tire rigidly to the rim. The inner or under surface of this base portion of the tire has applied thereto by cementing, vulcanization, or in any other known manner a series of tough canvas plies or strips, (designated by 7.)

To the outer face of the rim 3 is applied a plain metal band or rim 8, similar to the usual metal tire applied to ordinary vehicle-wheels, which latter coöperates with the canvas strips 7 in the application of the tire to the rim.

Referring now more particularly to the means for securing the above-described parts in rigid fixed relation to each other, 9 designates a pair of annular retaining-plates which are adapted to be secured to the rim 3 by a series of suitably-spaced bolts 10, passing transversely through the said rim and through the inner or lower portion of said retaining-plates 9, as plainly shown in Fig. 2. The outer or upper edge of said retaining-plates is bent over inwardly to engage the shoulders 6 of the tire 4 in the manner plainly disclosed in Fig. 2. Extending transversely through the base of the tire is a series of suitably-spaced wires 11, forming cross-stays, these wires being embedded in the solid material of the tire and preferably lying flush with the upper surface of the shoulders 6, so that the upper portions of the ends thereof are engaged by the inwardly-turned edges of the retaining-plates 9. These cross-stays 11 are straight and rigid and made of such a length that their inner ends will directly abut and be clamped endwise by the inner opposing faces of the retaining-plates. As an additional safeguard to prevent bending or buckling of the cross-stays under severe lateral strains, especially in the case of tires intended for heavy vehicles, as automobiles and the like, I embed in the body of the tire, longitudinally thereof, directly above the said cross-stays and substantially centrally thereof, an endless retaining wire or band 12.

By forming the base portion of the tire of greater width than the body portion and applying the tire securing or retaining means to the extremities of said base portion the resistance of the latter to lateral strains tending to wrench the tire from its seat is most effectively applied, and, furthermore, the said retaining-plates have an additional function in effectually preventing the introduction of dirt, moisture, and other objectionable foreign matter into the joint between the tire and the rim. By so locating the cross-stays 11 that their ends are directly engaged by the inner faces and inwardly-turned edges of the retaining-plates 9 a most effective resistance is presented to both lateral and radial displacement of the tire relatively to the rim. The presence of the canvas plies or strips 7 on the inner face of the tire forms an additional strengthening and stiffening means therefor and also provides a tough and durable wearing-face for engagement with the metal covering 8 of the rim.

It has been found in practice that in the case of solid-rubber tires the tendency is for the tire to break and separate along a line which demarks that part of the body of the tire which is held practically immovable to its connection with the rim and that part of the tire which is subject to movement under the compression and expansion due to the load upon the tire. This being true, a tire constructed in accordance with the present invention, wherein the support against which the tire rests is perfectly flat and at right angles to the load and wherein this base portion, by means of which the tire is attached to the rim, is not only reinforced, so as to suitably withstand the severe strains to which it is subjected, but is also held practically immovable by the confining cross-wires, produces a tire which, other things being equal, is substantially longer lived than the tires heretofore commonly used.

From the foregoing it will be seen that in my present invention I have attained the several objects thereof and produced an elastic tire for vehicles characterized by simplicity of form and structure and consequent economy of manufacture and provided with retaining means so devised that the tire may be most conveniently applied and detached without the use of special appliances and affords a maximum of resistance to the severe lateral strains to which the tire is subjected in use as well as serves to exclude dirt, grit, moisture, and other objectionable foreign matter from the joint between the tire and the rim, thus promoting the life, durability, and wearing qualities of the structure as a whole.

I claim as my invention—

1. In a vehicle-tire, the combination with a rim and a solid rubber tire, the latter having a pair of integral lateral offsets or shoulders at its base portion, of a pair of retaining-plates secured to the rim and having their outer edges bent inwardly and engaging said shoulders of the tire-base, a series of metal cross-stays passing transversely through the base portion of the tire and at their outer ends abutting and clamped endwise by the inner faces of said retaining-plates, and an endless retaining-wire embedded in and extending longitudinally through the body of the tire at right angles to, directly above, and substantially centrally of said cross-stays, substantially as described.

2. In a vehicle-tire, the combination with a rim provided with a plain flat metal band or tire, and a solid elastic tire, the latter having integral lateral offsets or shoulders at its base portion, of a series of metal cross-stays passing transversely through the base portion of the tire and at their ends lying flush with the sides and tops of said shoulders, an endless retaining-wire embedded in and extending longitudinally through the body of the tire, directly above and substantially centrally of said cross-stays, and a pair of annular retaining-plates secured at their inner edges to the rim on opposite sides thereof and having their outer edges bent inwardly toward each other to overhang and clamp the shoulders of the tire-base and the ends of the cross-stays, substantially as described.

3. In a vehicle-tire, the combination with a rim provided with a plain flat metal band or tire and a solid elastic tire, the latter having a pair of integral lateral offsets or shoulders at its base portion and having applied to the under surface thereof a canvas backing, of a series of metal cross-stays passing transversely through the base portion of the tire and at their ends lying flush with the sides and tops of said shoulders, an endless retaining-wire embedded in and extending longitudinally through the body of the tire above and substantially centrally of said cross-stays, and a pair of annular retaining-plates secured at their inner edges to the rim on opposite sides thereof and having their outer edges bent inwardly toward each other to overhang and clamp the shoulders of the tire-base and the ends of the cross-stays, substantially as described.

GEORGE B. DRYDEN.

Witnesses:
ALBERT H. GRAVES,
FREDERICK C. GOODWIN.